US008489269B1

(12) United States Patent
Galligan et al.

(10) Patent No.: US 8,489,269 B1
(45) Date of Patent: Jul. 16, 2013

(54) CROSS-PLATFORM GRAPHICAL SYSTEM DISPLAY

(75) Inventors: Matthew Galligan, Delran, NJ (US); Bruce J. Waldron, Newton, PA (US); John P. Waxler, Dresher, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 242 days.

(21) Appl. No.: 13/086,982

(22) Filed: Apr. 14, 2011

(51) Int. Cl.
*G06F 19/00* (2011.01)

(52) U.S. Cl.
USPC .......... 701/29.4; 700/100; 700/103; 700/106; 700/117; 700/222; 340/1.1; 340/2.4; 340/286.02; 340/5.54; 340/500; 600/300; 600/590; 707/999.008; 707/999.009; 707/999.01; 707/999.103; 707/999.104; 715/209; 715/234; 715/277; 715/733; 715/751

(58) Field of Classification Search
USPC ............. 701/29.4; 340/1.1, 2.4, 286.02, 5.54, 340/5.74, 500, 508, 522, 540, 870.01; 245/2.1, 245/156, 620; 348/14.09, 192, 400; 360/69, 360/88, 91, 137; 370/252, 260, 264, 431, 370/468, 503; 375/222, 369; 379/202.01, 379/265.03, 265.11, 266.08, 269, 309, 209; 434/156, 350; 493/133, 141, 242, 470; 600/300, 600/590; 700/100, 103, 106, 109, 117, 222; 705/3, 35; 707/999.008, 999.009, 999.01, 707/999.103, 999.104, 999.107, 999.202; 710/18, 38, 240, 244; 711/115; 714/712, 714/735, 823; 715/209, 234, 277, 719, 733, 715/751, 839, 841, 962, 977, 162; 719/330
See application file for complete search history.

(56) References Cited

U.S. PATENT DOCUMENTS

| 5,665,951 | A | 9/1997 | Newman |
| 6,085,229 | A | 7/2000 | Newman |
| 2004/0083280 | A1 * | 4/2004 | Houston et al. ................ 709/223 |
| 2005/0114361 | A1 * | 5/2005 | Roberts et al. ................ 707/100 |
| 2010/0122175 | A1 * | 5/2010 | Gupta et al. ................... 715/735 |

OTHER PUBLICATIONS

USPTO Office Action; Double Patenting Rejection; dated Nov. 1, 2012; regarding U.S. Appl. No. 12/893,018.
Applicants' Response to USPTO Office Action of Nov. 1, 2012 with respect to U.S. Appl. No. 12/893,018.
Actiontec Wireless Cable Router Model #: GT701WRU User Manual, retrieved Jul. 22, 2010.
About BelTsmart, retrieved from http://www.beitsmart.com, on Jul. 22, 2010, 2000-2009 Belarc, Inc.

(Continued)

*Primary Examiner* — McDieunel Marc
(74) *Attorney, Agent, or Firm* — Kyle Eppele; J. Eric Anderson (57) ABSTRACT

A graphic user interface (GUI) display of computer status is provided across multiple computer platforms. A computer and physical layout are identified and this information is used to provide a desired set of displays. Data is parsed from an output from the computer and is stored in a data store in a predetermined common format as a part of a collection of parsed data. A graphic display depicting a physical layout of at least one aspect of a computer or the physical layout is provided along with data retrieved from the collection of parsed data and corresponding to the computer associated with the display depicting the physical layout in accordance with the identification of the computer and physical layout.

4 Claims, 4 Drawing Sheets

OTHER PUBLICATIONS

BelTsmart support, "Frequently Asked Questions", retrieved from http://www.beitsmart.com, on Jul. 22, 2010, 2000-2009 Belarc, Inc.
Belarc System Management for the Internet Age, 2002-2010 Belarc, Inc.
Ross-Tech VCDS software description, Ross-Tech LLC, Lansdale, PA, downloaded Mar. 7, 2011.
Ross-Tech VCDS connection interfaces description, Ross-Tech LLC, Lansdale, PA, downloaded Mar. 7, 2011.
Ross-Tech VCDS vehicle applications description, Ross-Tech LLC, Lansdale, PA, downloaded Mar. 7, 2011.
Ross-Tech VCDS sample instructions, Mk-IV chassis, Ross-Tech LLC, Lansdale, PA, downloaded Mar. 7, 2011.
Ross-Tech VCDS 'Open Controller' screen, Ross-Tech LLC, Lansdale, PA, downloaded Mar. 7, 2011.
Ross-Tech VCDS 'Measuring Blocks' screen, Ross-Tech LLC, Lansdale, PA, downloaded Mar. 7, 2011.
Ross-Tech VCDS Generic OBD-II screen with 'Convert to VAG codes' option, Ross-Tech LLC, Lansdale, PA, downloaded Mar. 7, 2011.
US Patent Application entitled, Simplified System Status Advisor Providing Uniform Cross-Platform Status Information, Waxler et. al., U.S. Appl. No. 12/893,018, filed Sep. 29, 2010.

* cited by examiner

CROSS-PLATFORM GRAPHICAL SYSTEM DISPLAY

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil.

BACKGROUND

This disclosure relates to measurement and testing of computers and observing status of one or more computers as displayed on a graphic user interface (GUI).

SUMMARY

System status information is displayed in a common format which is used across multiple computer platforms. A predetermined communication protocol is used to identify a computer having an operating system and a system used by the identified computer is detected. Information is accessed from a stored database concerning characteristics of computers to identify particular model information for the identified computer and the operating system used by the computer. A command interpreter program function for issuing commands is accessed and a command is invoked, corresponding to the operating system of the identified computer and requesting data corresponding to the computer's status. An output from the computer corresponding to the command is received. Data corresponding to the computer's status from the received output is parsed and data from a collection of parsed data and corresponding to a computer associated with the display depicting the physical layout is retrieved. A graphic display including a depiction of a physical layout of the computer, including components of the computer is provided, and this provides the operator with a correspondence between data concerning the components and the components associated with the data, including the graphic display depicting the physical layout.

DETAILED DESCRIPTION

The present system provides a status advisor that addresses a need to create a unified (cross platform) application for monitoring computer system health. System health includes hardware, software, and network status. It also provides implications of failures and/or errors and remediation steps. As a result, the software conveys the impact and/or implications of a failure, as well as details regarding the failure. By way of non-limiting example, with a server with a RAID setup, if one disk is lost, the software will let the user know that currently the user has not lost any data, but an additional disk failure will cause data loss. In the case of probable data loss, the user will be informed of this. The information regarding the lost disk is provided in a graphic display, a system specific graphic is used as identified by the status advisor on the graphic display. This is useful for onsite trouble shooting and creates a log to be shared with help desk support. The logs can also be stored to analyze historical failures of systems or historical failures across multiple systems. This information may also be shared through a web service to a command center (a monitoring server) so multiple systems may be analyzed simultaneously.

In some enterprises, multiple system types are used, which requires that on-site maintenance personnel have an ability to perform maintenance and repair services on the multiple system types. Such maintenance is facilitated by use of a Graphical User Interface (GUI) which is capable of displaying information in a manner which is easily understandable by field maintenance personnel, even if the field maintenance personnel are unfamiliar with the particular system being diagnosed or maintained.

The present system detects the operating system or variant of the operating system of a computer system under test (Unit Under Test or UUT). Data is collected about that UUT, without previous configuration or specification of the UUT. Using the standardized communication and description techniques, data obtained from the UUT is read into the display module, and it is checked against an electronic record of all known systems. Thus, if the previous configuration or specification of the UUT is known, that information is used for displaying information concerning the UUT. In that case, the system's data is recognized and a model is available for that particular system, and the electronic record that describes the model is loaded into the display module. If the previous configuration or specification of the UUT is not known, a nearest match is used in the display of the information concerning the UUT. There are "safe fallback" values for each major type or operating system, such as the SOLARIS® operating system created by Sun Microsystems and now owned by Oracle Corporation of Redwood City, Calif. For example if a SOLARIS® system is detected, but the specific model is not recognized, a generic SOLARIS®module with modules most likely to work are loaded.

Additionally, some computer operating systems, such as the SOLARIS® system, do not have a unified GUI providing system diagnostics. SOLARIS® software users must perform numerous complex and time consuming diagnostic tasks to get a full picture of system health. Additionally, systems which do have GUI interfaces which indicate system health are usually proprietary. This means that the end user needs to be familiar with multiple tools to understand the status of each system on their network.

An electronic record may contain a set of known systems and their descriptions as follows:

Dimensions;
Textures/Images;
2D or 3D coordinates indicating the location of subcomponents; and
Position offsets or equations that indicate positioning of successive items in an array (such as disks, RAM, etc) that define how each subcomponent is laid out physically in that system.

For example, each memory module might be 5 cm to the right, from the last module, starting at a point defined in the X,Y,Z coordinates of the representation of the system. This arrangement is used to provide a corresponding representation of UUT on a display of the system, so that a technician can determine which physical device is associated with a displayed indication of the device. If the data concerning the system configuration is correct, then the operator will know which physical device is indicated. This is significant because in many cases, physical devices are given different and potentially inconstant device names. A common non-limiting example is if there are four devices and the third device is identified. In some systems, the first device may be labeled//dev00, so the third device may then be//dev02. By displaying the configuration, this sort of ambiguity is resolved by a visual image. Similarly, in some systems, mixed types of devices and virtual partitions of devices are used, which leads to further ambiguity in interpreting text information. By displaying the physical layout, it is possible for the operator to refer to the display of the layout to resolve ambiguities regarding which device is being described.

The display is used to describe to end users the exact location of problem components within a system, without having prior knowledge of what the target system is comprised of This extends to, but is not limited to, displaying disk arrays, networks, servers, workstations, and other devices.

Other devices that can be displayed as the UUT can include portable devices such as phones, or even automotive applications. In automotive applications, a uniform test port is often provided, such as an On Board Diagnostics port conforming to the OBD-II port. The OBD-II standard specifies a format of data used for emissions diagnostics, with variations in configuration, for example OBD-II ISO 15765 CAN (OBD-II CAN-BUS), SAE J1850 PWM and SAE J1850 VPW. In addition, the data provided for different makes and models diverges for systems not related to government regulation. The OBD-II port can be used to read a vehicle identification number (VIN), and the VIN is used to reference the make and model. Based on the make and model, the system can determine the diagnostic port protocols for the particular car being scanned. This further allows the system to load repair instructions for the particular car being scanned. In this manner, the system empowers the user to perform tasks quicker when performing diagnostics, repair, or troubleshooting. The ability to load particular repair instructions is advantageous where the output from the test port is ambiguous as a result of production changes in the UUT.

The described techniques are implemented in a program written in the JAVA® language, created by Sun Microsystems and now owned by Oracle Corporation of Redwood City, Calif., which utilizes modular design. It makes use of configuration and log files, which are constructed using XML. The program is initiated by the user launching the application. The application then detects its environment and runs targeted diagnostic routines. The diagnosis routines in some cases depend on which system is identified by the status advisor, and the results are stored in XML and interpreted by the status advisor based on the stored information.

The selection of diagnostic routines takes advantage of the fact that different systems can have different available diagnostics. By way of example, a more robust system may have more granular information or checks that can be run that a simpler system may not contain. Different systems also have system-specific tests based on what is being examined.

Particular systems, by their nature, have specific tests that may be performed. By way of non-limiting example, if a network attached storage device is being tested, different metrics may be tested, and the network attached storage device via a router. Depending on what is detected on the system, different modules may or may not be loaded. In another non-limiting example, if the IPL software is detected on a system, an "IPL" tab appears with information regarding database health, log status, application health, etc. With no IPL detected, nothing is shown and the user does not see any information related to this section.

These results are reported in a clear and consistent manner by providing an initial XML output and displaying the XML output on a GUI display. After diagnostics are run, each module's output is converted to XML. This XML is sent to a XML log, as well as interpreted to provide GUI output. The collection and display areas are loosely integrated, and use XML to communicate. The information from the initial XML output is also recorded for historical reference.

This XML output information can optionally be transmitted to a management server. Once there the reports can be run or the information can simply be reviewed. In typical cases, the reports can be reviewed by personnel who are familiar with the operation of the particular platform being reported on, which has the advantage of providing maintenance expertise in circumstances where local field maintenance personnel are not specifically trained on maintenance of a particular platform or are not familiar with a particular implementation (software or hardware) of a particular platform.

By way of non-limiting example, if a particular operating unit uses mostly SOLARIS® platforms, that unit may also have equipment using other platforms. These other platforms could be computer platforms for dedicated jobs, laptop computers or computers associated with specific hardware and software functions. Thus, the network comprising mostly SOLARIS® platforms may also have a networked Windows-based platform configured with specialty hardware and software to perform control or diagnostic functions on a particular piece of equipment. The field maintenance personnel may be well-versed in operating in the SOLARIS® environment, but not be specifically trained in the operation of the Windows system. In addition, even if trained in the Windows system, the operating personnel may not be familiar with the additional configurations used to operate the specialty hardware and used in the control and diagnostic functions. By allowing the information to be gathered in a uniform manner, and transferring data concerning the individual platforms to personnel expert in the operation of the individual platforms, the individual platforms can be easily maintained by a combination of local field personnel and remote specialists. This takes advantage of the local expertise of the local field personnel, and at the same time affords expert knowledge afforded by the remote specialists.

Figure 1:
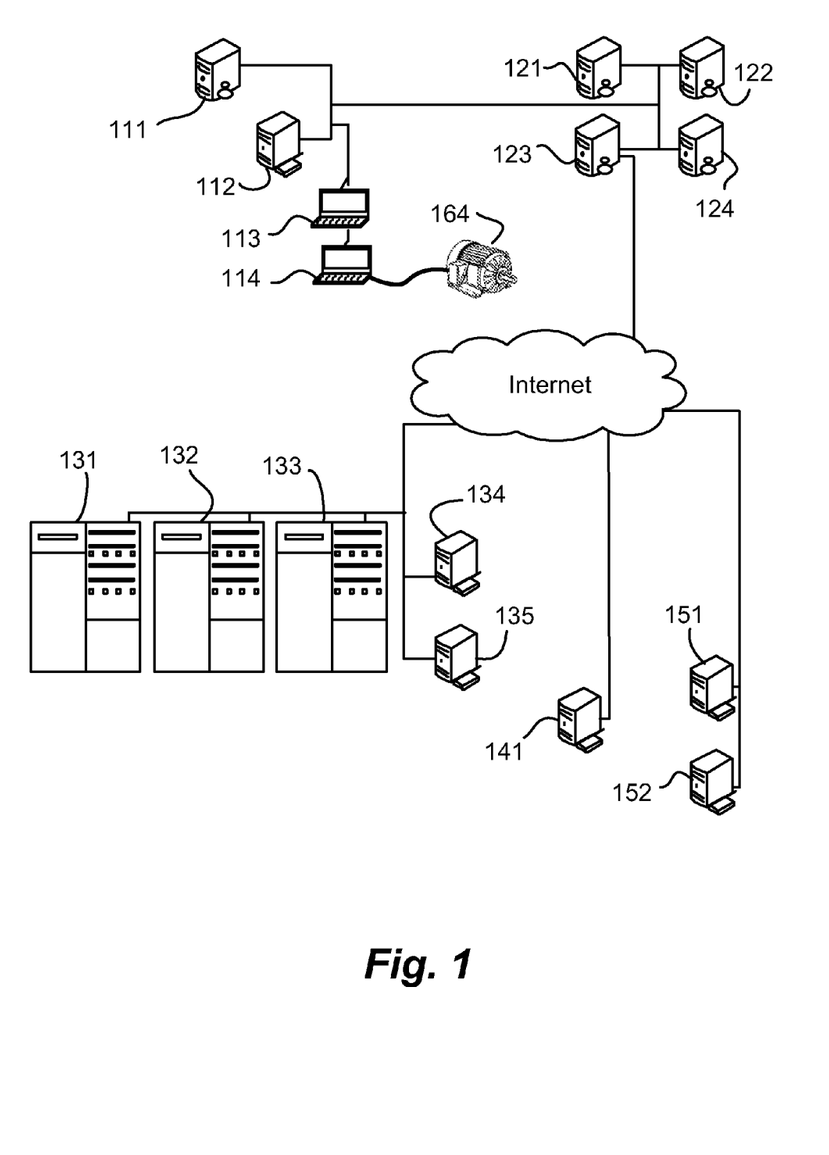
FIG. 1 is a diagram showing an example network configuration.

FIG. 1 is a diagram showing an example network configuration. The network includes multiple computers 111-114, 121-124, 131-135, 141, 151 and 152. Subsets of the computers are arrayed across multiple network connections, which can be LAN connections, internet connections, wireless connections, etc. In addition, the multiple computers may comprise multiple types, operating on different types of operating systems, and in some cases, the multiple types and different types of operating systems co-exist at one location. The computers may further have different or specialized functions, as represented by computer 114 monitoring external device 164 through a dongle connection.

The described techniques are implemented in a system monitor configuration referred to as Simplified System Status Advisor (S3Advisor). The system monitor configuration saves time for the operator, system administrator, and technical support by providing a unique view of system health. The system monitor configuration is designed to aid both inexperienced end-users and skilled help desk technicians in understanding the health of a system. The system monitor monitors hardware, software, and network status; providing a simplified view of these areas. The system monitor configuration can then assist personnel by in pointing system problems quickly, and directing novice users to critical issues.

Figure 2:
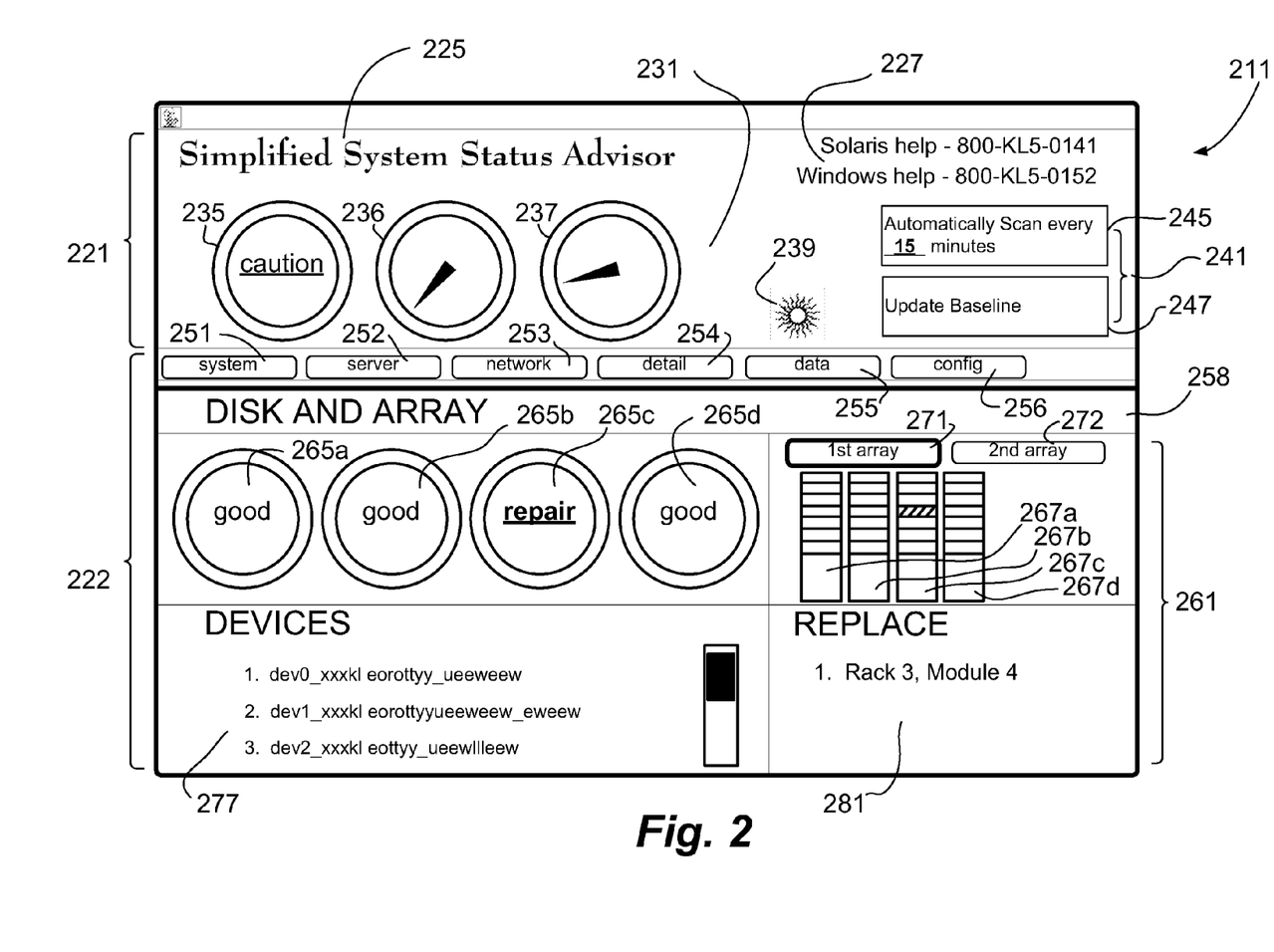
FIG. 2 is a display of a system analysis output, presented as a GUI window.

FIG. 2 is a display of a system analysis output, presented as a GUI window 211. By way of non-limiting example, the GUI is presented as a JAVA® output, in an X-Window display (X11; X.Org Foundation). Since JAVA® programming is generally functional across platforms, similar outputs can be presented on other systems, including those available from Apple Computers Microsoft and other providers of software systems having GUI interfaces.

GUI window 211 is divided into a top portion 221 and a bottom portion 222. A banner display 225 is also included and forms an aesthetic part of top portion 221. Banner display 225 includes general information unrelated to the operation of the system monitor functions, such as software version of the program, updatable current help desk information 227 and external communication functions. Banner display 225 can also include extraneous data monitored in the systems, such as software versions of the monitored systems and communication link status. The banner can be configured for a particular use so that a customer can present their own information (such as help desk numbers). The banner can be configured to display information as desired by the customer in any desired area.

Top portion 221 also includes system health display 231, with performance indicators 235-237, program activity status display 239 and program preference display 241. Program preference display 241 includes selections for frequency of scanning operations 245 and baseline update 247.

GUI window bottom portion 222 includes category specific information, and includes category tabs 251-256, a display of current category 258 and a display of information 261 related to the current category. Software versions of all installed software are listed under the "configuration" tab 256. The display of the current category 258 and the display of information 261 related to the current category may be more specific than the category listed in the category tabs 251-256 as a result of selection operations made within the current category 258. As depicted, the current category (given in the example as "disk and array") includes conditions indicators 265a, 265b, 265c, 265d, and graphic indications 267a, 267b, 267c, 267d of serviceable computer units to which condition indicators 265a, 265b, 265c, 265d correspond. Page indicators 271, 272 permit display of more serviceable computer units and conditions indicators in a paged menu format. This enables a display of graphics of system specific serviceable units.

GUI window bottom portion 222 also includes listings of current data, such as a "device manager" listing ("mount") 277 or similar listing relevant to the devices represented by the conditions indicators 265a-d, and graphic indications 267a-d. An action status display 281 provides a recommended set of actions for servicing or maintaining serviceable computer units represented by serviceable computer units displayed at graphic indications 267a, 267b, 267c, 267d of serviceable computer units.

Color coded tabs represent major system categories: System, Server Hardware, Disks & Array, Network, and Configuration. After selecting a category, the user is given an easy-to-understand summary of the selected area. This summary includes diagnostic information collected automatically by the system monitor, without the user having to run complex diagnostic operations. Data collected by the system monitor can also be shared with help desk support to aid in troubleshooting, failure analysis, and configuration management applications.

The system monitor provides detailed hardware information displayed on "Screenshot HARDWARE" and "Screenshot DISK and ARRAY." Detailed information is shown on the various screenshots, so for example, detailed networkd information is shown on "Screen Shot NETWORK." The network portion of the system monitor can include, by way of non-limiting example, detailed information about network quality of service, the user's default gateway, and similar conditions.

The system monitor provides a graphical user interface to monitor system health across many major hardware and software platforms, including SOLARIS® WINDOWS® (developed by Microsoft Corporation of Redmond, Wash.) and other platforms expected to be used in an enterprise. This saves time for system administrators and for help desk support. It also saves time training these individuals to support these systems.

The configuration provides a diagnostic tool which is user-friendly in that the cognizant information is presented in a substantially uniform configuration across multiple platforms, and in a manner which logically relates to maintenance tasks, and which enables an untrained operator to get picture of environment. Since the general configuration and the output displays are uniform, the system monitor provides a distributed diagnostic tool which can be used to obtain and analyze information on an entire enterprise. The common GUI interface also makes it easier for personnel trained to assist with one type of platform to assist on different types of platforms. This makes it possible to provide a unified monitoring and reporting interface across an entire enterprise, and eases sparing and reporting.

The information required to provide the cognizant information is retrieved from different platforms using techniques which differ according to the particular platform. While some of the data is a data output of a peripheral device, the means for generating the output and the display form of the output may vary. For example a display of MAC addresses of Ethernet cards can be rendered as a 12 digit number, displayed in hexadecimal pairs. An example is:

00-06-5B-15-04-B4 which can also be displayed as:

00:06:5 B:15:04:B4.

In order to render a display of the MAC address, each platform is queried differently. In SOLARIS®, the command is:

ifconfig-a rendering an output of:

le0: flags=863<UP,BROADCAST,NOTRAILERS,RUNNING,MULTICAST>mtu 1500 inet 131.225.80.209 netmask ffff800 broadcast 131.225.87.255 ether 0:6: 5b:15:4:b4

As may be expected, a similar command is used in Linux:

ifconfig-a rendering an output of:

eth0 Link encap:Ethernet HWaddr 00:06:5 B:15:04:B4 inet addr:131.225.84.67 Bcast:131.225.87.255 Mask:255.255.255.0

UP BROADCAST RUNNING MULTICAST MTU:1500 Metric:1

RX packets:15647904 errors:0 dropped:0 overruns:0

TX packets:69559 errors:0 dropped:0 overruns:0

Interrupt:10 Base address:0x300

In FreeBSD the command is:
dmesg
which will render the MAC address among other things.
In Windows, the command is typically a command line statement:
ipconfig/all
which renders a display, this one from Windows XP:

| | |
|---|---|
| Windows IP Configuration | |
| Host Name............: | merck |
| Primary Dns Suffix.......: | Worknetwork.local |
| Node Type............: | Hybrid |
| IP Routing Enabled........: | No |
| WINS Proxy Enabled........: | No |
| DNS Suffix Search List......: | Worknetwork.local |
| Ethernet adapter Local Area Connection: | |
| Connection-specific DNS Suffix.: | |
| Description...........: | Intel(R) PRO/100 VE Network Connection |
| Physical Address.........: | 00-06-5B-15-04-B4 |
| Dhcp Enabled...........: | Yes |
| Autoconfiguration Enabled....: | Yes |
| IP Address............: | 10.10.10.111 |
| Subnet Mask...........: | 255.255.255.0 |
| Default Gateway.........: | 10.10.10.1 |
| DHCP Server...........: | 10.10.10.2 |
| DNS Servers...........: | 10.10.10.2 |
| | 10.10.12.25 |
| Lease Obtained........: | Monday, 19-Jul-2010 08:52:52 |
| Lease Expires........: | Tuesday, 27-Jul-2010 08:52:52 |

In MAC OS®-X and later versions of the Apple Computer operating system, UNIX® (a registered trademark of The Open Group, having offices in San Francisco, Calif.) operating system (OS)-like commands are invoked, although user display of the information is generally rendered through a GUI.

In each of these cases, the commands and information provided is different, but each contain the same piece of information. The device (an example Ethernet card having a MAC address of 00-06-5B-15-04-B4) is the same; however the command statements and the display of the output information is different among different machines, and even among different "flavors" of UNIX. In the case of an Ethernet card, the level of sophistication to read the MAC address from this data is well within the capabilities of a technician, and in this example simple enough that, given the proper instructions, is within the capabilities of the average computer user. Nevertheless, the formats of the command interface, the command statements and the display of information is substantially different.

It is also apparent that other types of information are displayed either by the same command or different commands, depending on which platform is employed. For example, the Windows example displays some network configuration data along with the physical address rendered by the "ipconfig/all" command statement.

Despite these differences, the basic function, which is to read the MAC address, is the same. By providing a common interface, the desired information can be rendered in a logical format which is uniform across platforms. The rendering, however, is a multi-step process because the data is first obtained according to the platform, parsed into a database having a common data format, and then displayed in association with a display of the physical layout of at least one aspect of the computer. The display also includes an indication of the actual output, which enables the user to both see an output in a format accepted for the particular platform, and confirm that the actual output corresponds to the display of the data in the common data format. In this regard, it is presumed that a technician familiar with a particular platform would find it advantageous to see data in the format rendered by that particular platform to either confirm the integrity of the data displayed in the common data format or to understand the data displayed in the common data format. This also allows the technician to observe a display of data which may contain information which does not appear in the common format, such as the computer's name for the device, for example "hd0_xxx".

Figure 3:
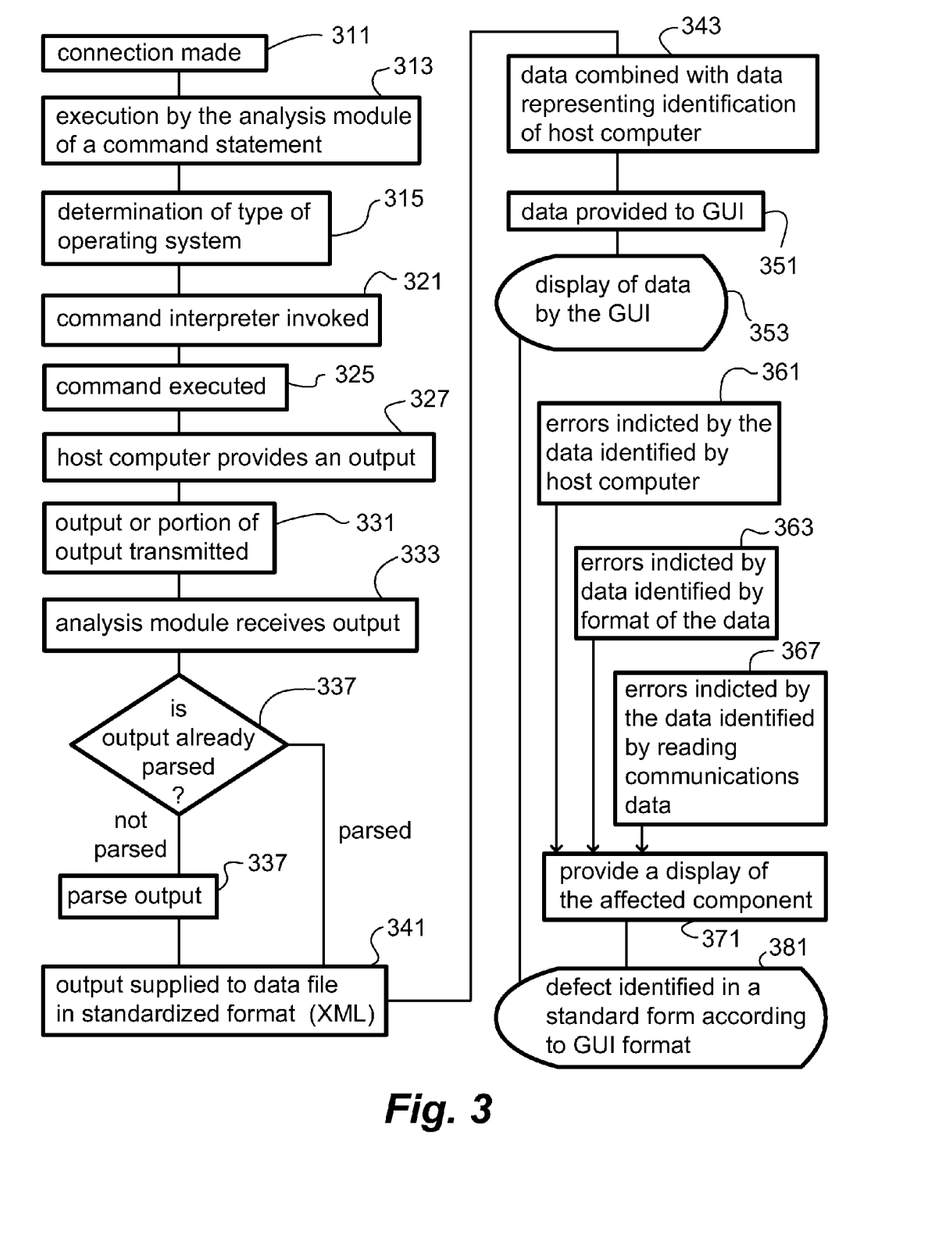
FIG. 3 is a flow diagram showing rendering of a display of system status in a common format on a GUI.

FIG. 3 is a flow diagram showing rendering of a display of system status in a common format on a GUI. The rendering is a multi-step process. First, a connection is made (step 311) by an analysis module with a host computer to enable execution by the analysis module of a command statement (step 313). Next, a determination (step 315) is made of the type of OS being used on the particular host computer.

For each supported platform (computer and OS) there is a pluggable module for each metric that is loaded into a collection based on the current detected platform. This can be accomplished using generic modules and a standard template for each platform, so that each module gets loaded into a queue of modules. Each logical grouping (e.g., "Disk", "Server", etc.) runs in parallel with the others. As a result, for each metric, there is a function such as "CollectServerDisks" that gets loaded from the appropriate platform's module. By way of example, a Windows/Dell platform will have a "CollectServerDisks" module and a SOLARIS®/v440 platform will also have "CollectServerDisks" module. The two function calls are the same ("CollectServerDisks"), although the two "CollectServerDisks" modules would be different. The category/area determines which of the modules to execute. The single subroutine interpreting multiple commands would have essentially the same effect, just with the decision branches being at different points in time.

By using similar function calls, it is possible to keep maintainability high and to reduce the complexity of this area of the code.

After determining the type of OS is being used (step 315), the appropriate command interpreter is invoked (step 321) on the particular host computer. Typically, this is a command line interface; however, the information may be input in any convenient format. Next, the command is executed (step 325) by the analysis module on the host computer in a manner that provides an output (step 327) suitable for reception by the analysis module, and the output or a portion of the output is transmitted (step 331) by the host computer back to the analysis module. The determination of the system type (step 315), invocation of the command interpreter (step 321) and execution of the command (step 325) is performed according to system type, but may be accomplished by formatting sets of instructions in a manner to execute subsets of the instructions only on the platform for which those instructions are intended. This is a feature available among program languages such as JAVA®, which are intended for use across multiple platforms, and which has a capability of determining which OS it is operating under. It still may be necessary, however, to separately identify the specific configuration of the computer. By way of example, in JAVA®, it is possible to determine inherently if the OS is a particular version of SOLARIS®, LINUXO (developed by Linus Torvalds), WINDOWS®, MAC-OS® (developed by Apple Computer of Cupertino, Calif.) or another OS, but beyond that, further investigation is required to discern a Dell from a Hewlitt Packard system, or a SOLARIS® Unix box from a NextCom system. For this reason, there will be additional probes needed in many cases to determine between hardware platforms or other derivations.

The analysis module receives the output (step 333), and if the output is not already parsed, parses the output (step 337). Next, the output is supplied to a data file in a standardized format (step 341). By way of non-limiting example, the output is supplied as data in XML format.

In this example, each module has a "Data" object which contains a hash table of metric types and values. For example, if a server has: temperature, fan, etc, then the "Data" object stores values for each of the metric types. In the Collection phase of each metric, the "Data" object is populated in a uniform manner with standard terms across all platforms. In the analysis phase, a standard cross-platform routine analyzes the uniform output from the various platform-specific collection routines, and generates meaningful results.

The XML is generated directly, in a generic manner from the categories (areas), modules, and metrics. Each module and category serializes itself to XML for reading later. Each category contains a collection of modules which are included in its XML, and the application houses a collection of categories. For example a block from the "Server" category might include data such as:

```
<category name="Server">
    <module name="ServerInfoDell">
        <metric name="ServerPowerSupplies">
            <psu id="0" status="good"/>
            <psu id="1" status="failed"/>
        </metric>
```

This is generated recursively from the collection of categories and combines each individual metric's XML output. When the program is loaded into memory, all of the collected metrics are available to be probed by the GUI.

The data in the XML format is combined (step 343) with data representing the identification of the host computer, using data from the host computer or data already stored in a database. Next, the data in the XML format is provided (step 351) to the GUI, in order to display the data in a format as established by the GUI (step 353). Errors indicted by the data are either identified as such by the host computer (step 361) or determined by the format of the data (step 363). The host computer can overtly output, for example, a fan failure, or the system monitor configuration can detect a problem when there are no fan sensors on board, even if there is no overt error from the system.

While the GUI has a standardized format, portions of the data supplied to the GUI can be specific to the type of computer. For example, the data displayed in GUI window bottom portion 222 may present the data in a format corresponding to the particular operating system, such as the format "dev0_xxx" depicted in FIG. 2.

The errors can be derived from any convenient source on the host computer, but are obtained by reading data on the host computer (steps 361, 363), or in some cases, by reading communications data (step 367) received from the host computer. A physical configuration database is used by the analysis module to provide a display of the affected component (step 371). Thus, if, for example, the host computer provides data related to a particular disk drive showing a defect, this data is matched to the physical configuration database.

The physical configuration database is used to control how the physical configuration is displayed in graphic indications 267a, 267b, 267c, 267d of serviceable computer units. In the case of the particular disk drive showing a defect, the particular one of graphic indications 267a, 267b, 267c, 267d of serviceable computer units has a representation of the particular component identified. As can be seen, this graphic display is different in form from the data provided by the host computer, in that the defect is identified in a standard form (step 381) according to the GUI format, and an indication of the identification of the cognizant component is displayed on a graphic display as determined by information on the physical configuration database.

It is noted that the analysis module can be on a separate computer or can be on the host computer. The display output would be similar, because the display output is dependent on the information obtained from the computer and the display of the GUI in accordance with the physical configuration database. As noted above, the XML log notes which platform-specific modules are loaded, and when re-viewing a XML file, the correct routines will re-analyze the data on the remote expert's machine. The display on the host computer would not require network communication in order to obtain the data, but the information from the GUI can be communicated across the network. Since the GUI is based on the XML file, this display can be replicated remotely, using the same data (or a copy of the same data). This allows a remote expert reviewing the data to see essentially the same display as local personnel.

A further use of the technique is in maintenance and diagnostics of cross-platform configurations. A particular peripheral device may be programmed for use on a particular platform, with adaptations or hacks enabling the device to be used on other platforms. By displaying functions on a common GUI interface, those functions unrelated to the specific hack can be reviewed by program or device support personnel without requiring specific expertise on non-supported platforms.

Figure 4:
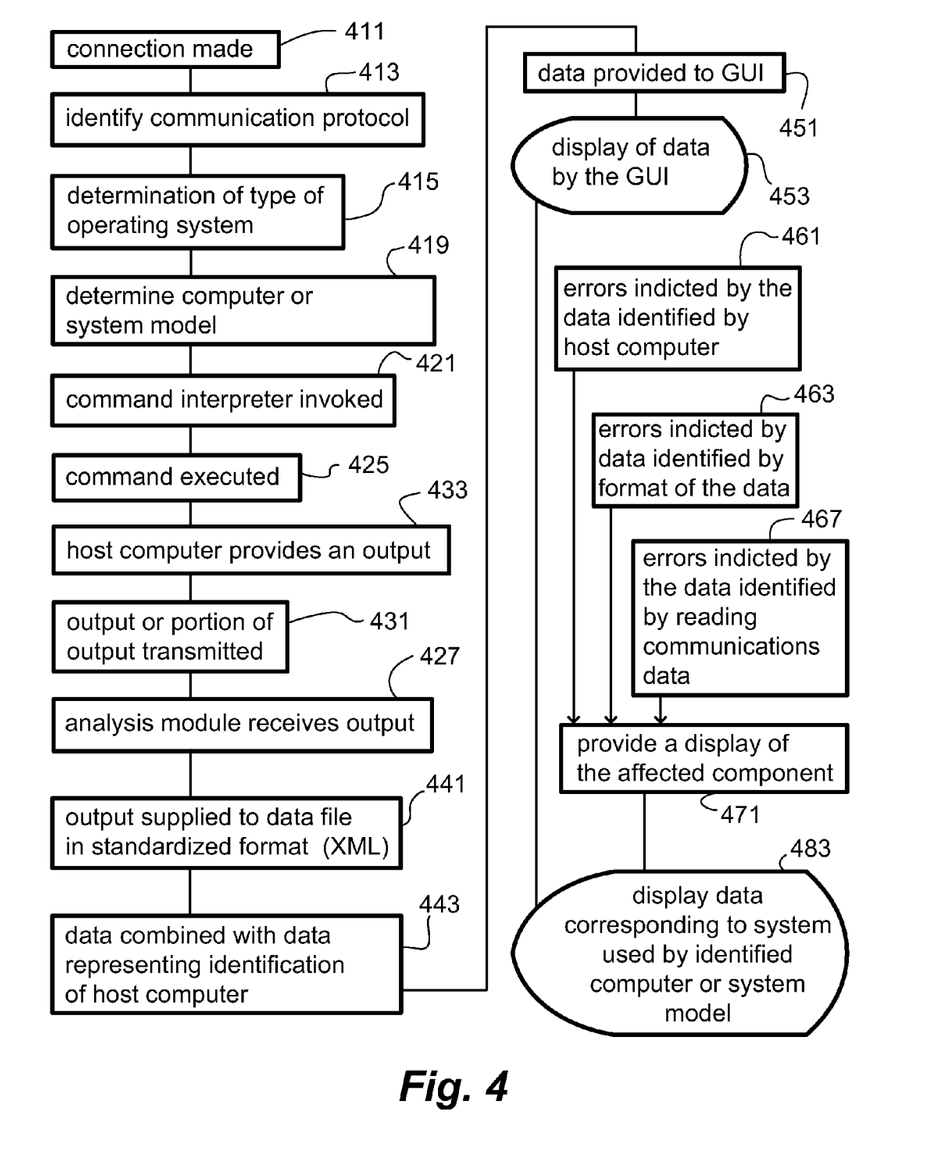
FIG. 4 is a flow diagram showing rendering of a display of system status in which a graphical display uses a database which identifies system components according to the particular system being analyzed.

FIG. 4 is a flow diagram showing rendering of a display of system status in which a graphical display uses a database which identifies system components according to the particular system being analyzed. This allows a computer with a display to be used for a communication port in which a specific set of data conforms to a communication standard, but which renders other data according to specific configurations of a system. A non-limiting example of this is an automotive diagnostic port such as an On Board Diagnostics port conforming to the OBD-II standard.

First, a connection is made (step 411) by an analysis module with a host computer to enable execution by the analysis module, and the communication protocol is identified (step 413). Next, a determination (step 415) is made of the type of operating system (OS) being used on the particular host computer.

For each supported platform (computer, OS and associated equipment) there is a pluggable module for each metric that is loaded into a collection based on the current detected platform. This can be accomplished using generic modules and a standard template for each platform, so that each module gets loaded into a queue of modules. The computer with the display identifies the computer or system model, including associated equipment (step 419) and loads the information concerning that particular UUT. This provides a category/area and determines which of the modules to execute, and which protocols to invoke to operate the modules.

After determining the computer or system model (step 419), the appropriate command interpreter is invoked (step 421) on the particular host computer of the particular system being analyzed. Typically, this is a command line interface; however, the information may be input in any convenient format. Next, the command is executed (step 425) on the host computer in a manner that provides an output (step 427) suitable for reception by the analysis module, and the output or a portion of the output is transmitted (step 431) by the host computer back to the analysis module. The determination of the system type (step 415), invocation of the command interpreter (step 421) and execution of the command (step 425) is performed according to system type, but may be accomplished by formatting sets of instructions in a manner to execute subsets of the instructions only on the platform for which those instructions are intended, and if applicable, the associated equipment determined in step 419.

The analysis module receives the output (step 433), and if the output is not already parsed, parses the output (step 437). Next, the output is supplied to a data file in a standardized format (step 441) in accordance with the UUT. The data is converted to a format used by the analysis module in order that the computer with the display can perform data manipulation functions. By way of non-limiting example, the data may be converted to an XML format.

The data in the format used by the analysis module is combined (step 443) with data representing the identification of the host computer, using data from the host computer or data already stored in a database. Next, the data in the format used by the analysis module is provided (step 451) to the GUI, in order to display the data in a format as established by the GUI (step 453). Errors indicted by the data are either identified as such by the host computer (step 461) or determined by the format of the data (step 463). The host computer can overtly output, for example, a fan failure, or the system monitor configuration can detect a problem when there are no fan sensors on board, even if there is no overt error from the system.

While the GUI has a standardized format, portions of the data supplied to the GUI can be specific to the type of computer. For example, the data displayed in GUI window bottom portion 222 may present the data in a format corresponding to the particular unit under test.

The errors can be derived from any convenient source on the host computer, but are obtained by reading data on the host computer (steps 461, 463), or in some cases, by reading communications data (step 467) received from the host computer. A physical configuration database is used by the analysis module to provide a display of the affected component (step 471). Thus, if, for example, the host computer provides data related to a particular disk drive showing a defect, this data is matched to the physical configuration database.

The graphical display uses a database which identifies system components according to the particular system being analyzed. The physical configuration database is used to control how the physical configuration is displayed in graphic indications of serviceable computer units, or in a logical presentation of service functions. The graphical display also permits user interaction with the UUT through the computer with the display in order to control the service functions. The data is displayed (step 483) in a manner consistent with the configuration of the UUT according to the GUI format, and an indication of the identification of the cognizant component is displayed on a graphic display as determined by information on the physical configuration database. This allows display in a manner corresponding to a system used by the identified computer or system model. As is the case with the system described in connection with FIG. 3, this graphic display is different in form from the data provided by the host computer.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for gathering and displaying system status information in a common format for multiple computer platforms, the method comprising:
   using a predetermined communication protocol on a first computer to identify a second computer having an operating system;
   detecting the operating system used by the second computer;
   accessing information from a stored database on the first computer containing characteristics of computers to identify particular model information for the second computer and the operating system used by the second computer;
   accessing a command interpreter program function resident on the first computer for issuing commands;
   issuing a command compatible to the operating system of the second computer, the command requesting data corresponding to the status of the second computer;
   receiving an output from the second computer in response to the command;
   parsing on the first computer the data corresponding to the status from said received output;
   storing the parsed data in a data store in the first computer as a part of a collection of parsed data;
   retrieving data from the collection of parsed data corresponding to a computer model associated with the display depicting the physical layout; and
   providing a graphic display on the first computer including a depiction of a physical layout of the second computer, including components of the computer, thereby providing the operator with a correspondence between data concerning the components and the components associated with the data; and
   incorporating data from the collection of parsed data into the graphic display depicting the physical layout of the second computer.

2. The method of claim 1, further comprising:
   displaying data on the graphic display of the first computer depicting specific data as provided by the received output from the second computer in a format generated by the first computer, thereby presenting the data in a format corresponding to the particular operating system along with display of data in a common format.

3. The method of claim 1, further comprising:
   using information provided in accordance with a data format of the predetermined communication protocol to identify an operating a-system associated with the second computer; and
   responding to the identified operating system to provide to the user a set of instructions in accordance with the identified system, including information displayed in response to querying the second computer.

4. The method of claim 1, further comprising:
   using, as the predetermined communication protocol, an automobile diagnostics protocol;
   using information provided in a format for the automobile diagnostics data protocol to identify a type of vehicle associated with the second computer; and
   responding to the identified type of automobile to provide to the user a set of instructions in accordance with the second computer operating system, including information displayed in response to querying the second computer.

\* \* \* \* \*